United States Patent [19]

Ho

[11] Patent Number: 5,000,102
[45] Date of Patent: Mar. 19, 1991

[54] METHOD FOR COMBUSTING WET WASTE

[75] Inventor: Min-Da Ho, Somers, N.Y.

[73] Assignee: Union Carbide Industrial Gases Technology Corporation, Danbury, Conn.

[21] Appl. No.: 454,452

[22] Filed: Dec. 21, 1989

[51] Int. Cl.⁵ .............................................. F23G 7/04
[52] U.S. Cl. ................................. 110/346; 110/229; 110/238; 431/9
[58] Field of Search ..................... 110/229, 238, 346; 431/9, 10

[56] References Cited

U.S. PATENT DOCUMENTS

| | | | |
|---|---|---|---|
| 4,378,205 | 3/1983 | Anderson | 431/5 |
| 4,509,434 | 4/1985 | Boday et al. | 110/238 |
| 4,541,796 | 9/1985 | Anderson | 431/187 |
| 4,622,007 | 11/1986 | Gitman | 432/13 |
| 4,797,087 | 1/1989 | Gitman | 431/10 |
| 4,861,262 | 8/1989 | Gitman et al. | 431/5 |
| 4,863,371 | 9/1989 | Ho | 431/9 |
| 4,882,010 | 11/1989 | Roos | 110/238 X |

OTHER PUBLICATIONS

Combustors: Applications and Design Considerations, Bartok et al., Chemical Engineering Progress, Mar., 1988 pp. 54-71;

Primary Examiner—Edward G. Favors
Attorney, Agent, or Firm—Stanley Ktorides

[57] ABSTRACT

A method for combusting wet waste wherein heat released by the combustion of combustibles from dry waste is recirculated by operation of high velocity oxidant in order to dry wet waste.

14 Claims, 1 Drawing Sheet

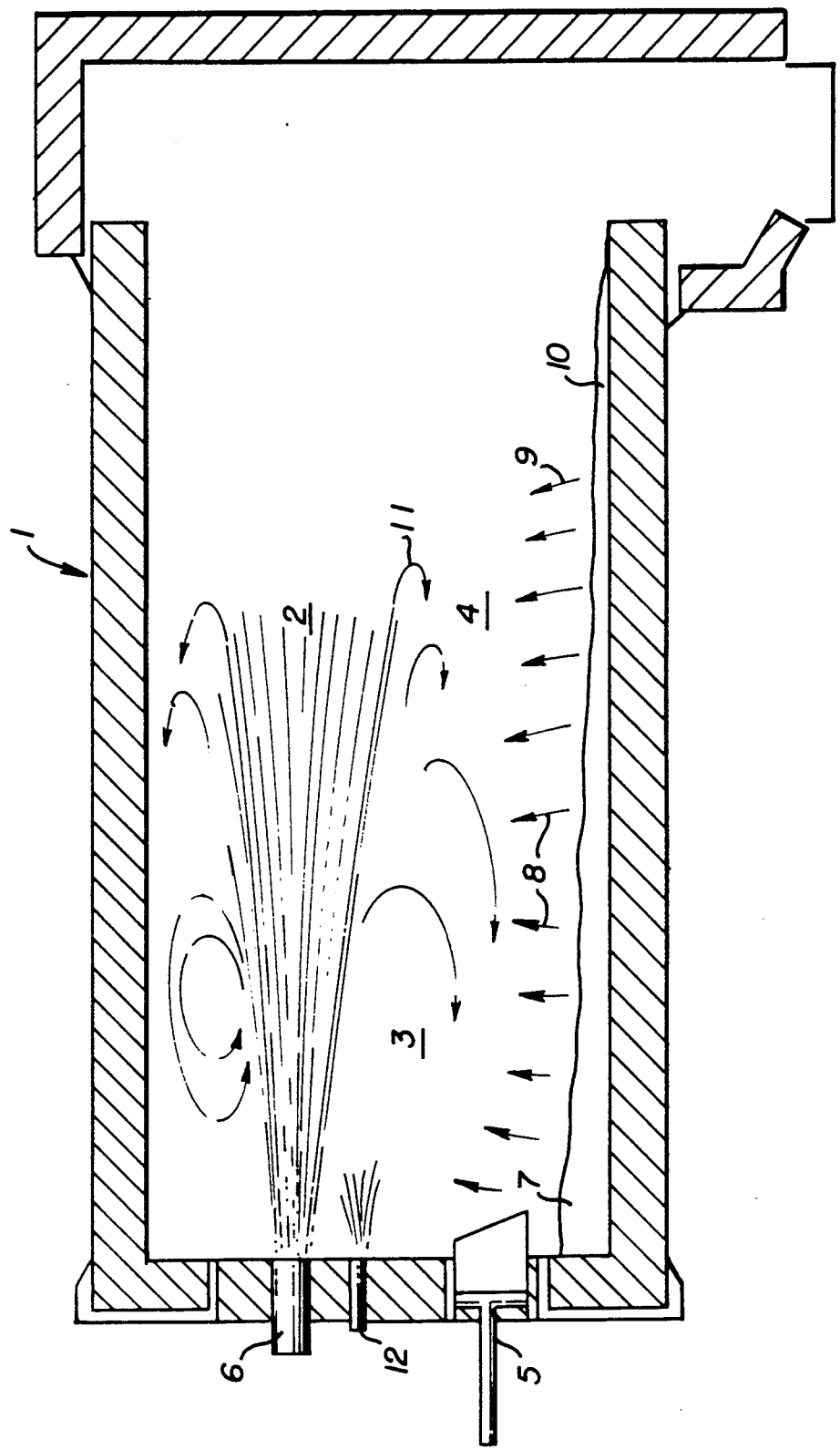

METHOD FOR COMBUSTING WET WASTE

TECHNICAL FIELD

This invention relates generally to the combustion of wet material and is particularly applicable to the incineration of wet solid waste.

BACKGROUND ART

Wet material must be dried to some extent prior to combustion. In an incinerator, such as a rotary kiln, waste is passed through the length of the incinerator while undergoing incineration. If the waste contains a significant amount of water a burden is placed on the combustion process. This is because the wet waste first passes through a heat sink area of the incinerator wherein heat passes into the waste to dry it. Thereafter the dried waste is combusted releasing heat. Unfortunately this heat is downstream of the heat sink area. Accordingly heat must be provided to the heat sink area from a burner. This is disadvantageous not only due to the added capital and operating costs of this burner, but also more importantly because this mode of operation increases the potential for hot spots within the incinerator. Unless the incinerator temperature profile is very closely watched and maintained, there may be hot spots from overheating in the drying or heat sink area, and hot spots in the downstream area where the waste is combusted liberating heat. Maintenance of a proper temperature profile is difficult within an incinerator because the waste generally has a very highly variable water content and heating value. Hot spots, which may occur due to sudden changes in the heat demand within the heat sink area or the heat liberated from the combusting waste, are undesirable because they cause equipment damage or slag buildup and also because they kinetically favor the formation of nitrogen oxides which are considered deleterious pollutants.

In order to avoid these problems, wet waste is sometimes passed through a separate dryer prior to being passed through an incinerator. This complicates and adds to the capital costs of an incineration operation.

Accordingly, it is an object of this invention to provide a method for combusting wet waste wherein the waste is dried within the incinerator without increasing the potential for hot spots within the combustion zone.

SUMMARY OF THE INVENTION

The above and other objects which will become apparent to those skilled in the art are attained by the present invention which is:

A method for combusting wet waste comprising:

(A) providing wet waste into a heat sink portion of a combustion zone, said waste comprising volatile combustible material and volatile incombustible material;

(B) providing oxidant free of fuel into the combustion zone at a velocity sufficient to cause a recirculation flow within the combustion zone;

(C) volatizing incombustible material from the wet waste within the heat sink portion;

(D) passing waste from the heat sink portion to a heat source portion of the combustion zone downstream of the heat sink portion;

(E) volatizing combustible material from the waste within the heat source portion;

(F) combusting oxidant and volatized combustible material to produce hot combustion products; and (G) recirculating hot combustion products from the heat source portion to the heat sink portion to carry out the volatization of step (C).

As used herein, the term "waste" means any material intended for partial or total combustion within a combustion zone.

As used herein the term "burner" means a device through which both oxidant and combustible matter are provided into a combustion zone either separately or as a mixture.

As used herein the term "lance" means a device through which only one of oxidant and combustible matter are provided into a combustion zone.

As used herein the term "recirculation ratio" means the ratio of the mass flowrate of material recirculated back toward the periphery of a jet to the mass flowrate of the total fluid input to the combustion zone.

As used herein the term "combustible" means a substance that will burn under combustion zone conditions.

As used herein the term "incombustible" means a substance that will not burn under combustion zone conditions.

As used herein the term "wet waste" means waste having a volatile incombustible content equal to or greater than 15 percent.

As used the term "volatile" means a material which will pass into the vapor state under combustion zone conditions.

BRIEF DESCRIPTION OF THE DRAWING

The sole FIGURE is a schematic representation of one embodiment of the invention wherein the combustion is carried out as part of an incineration process using a rotary kiln.

DETAILED DESCRIPTION

The method of this invention will be described in detail with reference to the Drawing.

Referring now to the Figure, there is illustrated rotary kiln 1 within which there is combustion zone 2. The combustion zone comprises a heat sink portion 3 proximate the feed end of the kiln, and a heat source portion 4 downstream of the heat sink portion.

Wet waste 7 is provided into the heat sink portion of the combustion zone such as through ram feeder 5. The waste may be liquid waste and/or solid waste such as is defined in the Resource Conservation Recovery Act (RCRA) or the Toxic Substances Control Act (TSCA). The waste comprises volatile combustible material and volatile incombustible material. Among the many volatile combustible materials which can comprise the wet waste one can name waste oils, solvents, halogenated hydrocarbons, creosote, and pyrolysis products of solid organic materials such as wood, plastics and coal. Among the volatile incombustible materials which can comprise the wet waste one can name water and carbon dioxide.

Oxidant is provided into the combustion zone such as through lance 6. The oxidant is provided into the combustion zone free of fuel. The oxidant may be technically pure oxygen having an oxygen concentration greater than 99.5 percent, or it may be oxygen-enriched air having an oxygen concentration of at least 25 percent by volume and preferably greater than 30 percent.

The oxidant is provided into the combustion zone at a high velocity, preferably at a velocity sufficient to form a jet, so as to cause a recirculation flow to be set up within the combustion zone. Preferably the oxidant velocity is sufficient to establish a recirculation ratio greater than 4 and most preferably greater than 10. Generally the oxidant will be injected into the combustion zone at a velocity within the range of from 100 to 1000 feet per second.

Heat is provided to the wet waste within heat sink portion 3 by the flow within the combustion zone of hot combustion products from downstream, and from the further combustion of unburned volatized combustibles, as will be more fully described later. The heat causes incombustible material to be volatized 8 from the wet waste 7 within heat sink portion 3.

The resulting waste 10 which has been partially or totally dried is passed from heat sink portion 3 downstream to heat source portion 4. As can be appreciated by one skilled in the art, there is not a sharp demarcation between heat sink portion 3 and heat source portion 4. Much of the combustible material within the waste is volatized 9 from the dried waste 10 within the heat source portion. The resulting combustible vapor 9 is combusted with oxidant within the heat source portion to form hot combustion products. Hot combustion products include all species emerging from the combustion reaction and may include, for example, carbon dioxide, carbon monoxide, water vapor, hydrogen, unburned oxygen and nitrogen, as well as unburned volatized combustibles.

The hot combustion products are caused to flow upstream, i.e. recirculated within the combustion zone, by the recirculation flow 11 set up by the high velocity oxidant, from the heat source portion 4 to the heat sink portion 3. Furthermore unburned volatized combustibles may be further combusted within the heat sink portion. This results in a diffuse combustion reaction throughout the combustion zone. In this way heat is provided to the wet waste 7 within heat sink portion 3 to carry out the volatization of the incombustible material referred to above. Some volatile combustible material may also volatize or be steam stripped out of the waste within heat sink portion 3. Such volatized combustibles may undergo combustion within heat sink portion 3 providing further heat to carry out the volatization of the incombustible material. The combustion products may recirculate many times within the combustion zone before passing out of the combustion zone. In a preferred manner of carrying out the invention, much of the volatized combustible material is aspirated by the oxidant jet to the oxidant and is combusted at the periphery of the oxidant jet. This results in more stable combustion and increased heat release in the heat sink portion which enhances the heat transfer rate.

By use of the method of this invention wet waste can be dried within a combustion zone without increasing the potential for hot spots. The invention employs heat released from the combustion of material volatized from the waste to carry out the drying. In this way heat released within the heat source portion does not accumulate there to produce hot spots but rather is carried upstream to a heat demand area where the heat is gainfully employed to dry the wet waste. This reduces or eliminates the need for a separate combustion step within the heat sink portion to supply the heat required for drying the wet waste. With the method of this invention wet waste material with as low as 1000 BTU/lb in heating value, which corresponds to a water content of about 20 percent, can be incinerated without the need for auxiliary fuel. In contrast, conventional technologies require the use of auxiliary fuel input through a burner unless the waste contains a heat content greater than about 2500 BTU/lb. By effectively spreading out the heat generated within the heat source portion, not only is the drying carried out, but also the chance for furnace damage and the potential for $NO_x$ generation are reduced.

If desired, fuel may be injected into the combustion zone in addition to that volatized from the waste. In this case the fuel may be injected through a lance such as shown at 12 in the Figure. The fuel may be any fluid fuel such as natural gas, propane, fuel oil or even liquid waste. This injection method of fuel is beneficial compared to injection through a burner due to the reduced flame temperature and consequent $NO_x$ emissions attainable thereby.

As mentioned the waste provided into a combustion zone such as the rotary kiln of an incinerator is characterized by high variability. The method of this invention addresses this variability by providing strong recirculation and backmixing which serve to even out the fluctuation of heating value and moisture content of the waste. In addition, the method of this invention provides high mixing intensity with internal recirculation of hot combustion products, which results in more stable and complete combustion, even for relatively low heating value waste, without the need for an auxiliary fuel burner. The method of this invention may be carried out with either fuel-rich (pyrolytic) or oxygen-rich (oxidating) conditions within the combustion zone, as well as with stoichiometric conditions.

The following experiment is reported to further illustrate the invention and it is not intended to be limiting.

A cylindrical furnace was used to simulate a commercial furnace such as a rotary kiln. Technically pure oxygen was injected into the furnace from one end at a velocity of about 1000 feet per second. The oxygen was injected through six nozzles arranged in a circle, each nozzle being $\frac{1}{8}$ inch in diameter. Natural gas was introduced into the furnace zone through a plurality of ports along the cylinder length to simulate combustible material volatized from waste. Water was introduced at the input end of the furnace to simulate water introduced into a combustion zone with wet waste. The combustion was carried out with high recirculation and a very diffuse flame. The water was evaporated and the $NO_x$ emissions were measured at less than 0.01 lb $NO_x$ per million BTU. The temperature distribution was very uniform, with less than a 200 degree fahrenheit temperature differential throughout the furnace.

The experiment was repeated except that the fuel was not introduced into the furnace zone along its length but rather introduced proximate the oxygen input point. $NO_x$ emissions were measured at about 0.12 lb $NO_x$ per million BTU, thus indicating the effectiveness of eliminating hot spots by the use of the invention.

By providing most or preferably all of the heat input to a combustion zone from the waste, the throughput of the waste through the incinerator is increased, while effectively drying the wet waste and reducing the potential for hot spots and the attendant problems caused by such hot spots.

Although the invention has been described in detail with reference to certain embodiments those skilled in the art will recognize that there are other embodiments of the invention within the spirit and scope of the claims.

I claim:

1. A method for combusting wet waste comprising:

(A) providing wet waste into a heat sink portion of a combustion zone, said waste comprising volatile combustible material and volatile incombustible material, said wet waste being provided into the combustion zone in a direction away from the inlet end side of the combustion zone;

(B) providing oxidant free of fuel into the combustion zone at a velocity sufficient to cause a recirculation flow within the combustion zone, said oxidant being provided into the combustion zone in a direction substantially the same as the direction that the wet waste is provided into the combustion zone;

(C) volatizing incombustible material from the wet waste within the heat sink portion;

(D) passing waste from the heat sink portion to a heat source portion of the combustion zone downstream of the heat sink portion;

(E) volatizing combustible material from the waste within the heat source portion;

(F) combusting oxidant and volatized combustible material to produce hot combustion products; and (G) recirculating hot combustion products from the heat source portion to the heat sink portion to carry out the volatization of step (C).

2. The method of claim 1 wherein the volatile incombustible material is water.

3. The method of claim 1 wherein the oxidant is technically pure oxygen.

4. The method of claim 1 wherein the oxidant is oxygen-enriched air.

5. The method of claim 1 wherein the oxidant is provided at a velocity within the range of from 100 to 1000 feet per second.

6. The method of claim 1 wherein the oxidant is provided at a velocity sufficient to achieve a recirculation ratio of at least 4.

7. The method of claim 1 further comprising providing fuel to the combustion zone separate from the oxidant.

8. The method of claim 1 wherein the conditions within the combustion zone are oxidating.

9. The method of claim 1 wherein the conditions within the combustion zone are pyrolytic.

10. The method of claim 1 further comprising volatizing combustible material from the waste within the heat sink portion.

11. The method of claim 1 further comprising combusting volatized combustible material within the heat sink portion to provide heat for the volatization of incombustible material.

12. The method of claim 11 wherein the combustible material combusted within the heat sink portion is from unburned combustible material recirculated from the heat source portion to the heat sink portion.

13. The method of claim 11 wherein the combustible material combusted within the heat sink portion is from combustible material volatized from the waste within the heat sink portion.

14. The method of claim 1 further comprising aspirating volatized combustible material to the oxidant and combusting combustible material at the periphery of the high velocity oxidant stream.

* * * * *

UNITED STATES PATENT AND TRADEMARK OFFICE
CERTIFICATE OF CORRECTION

PATENT NO. :  5,000,102
DATED :  March 19, 1991
INVENTOR(S) :  Min-Da Ho It is certified that error appears in the above-identified patent and that said Letters Patent is hereby corrected as shown below:

In column 1, lines 60 and 65, delete "volatizing" and insert therefor - - volatilizing - -.

In column 1, lines 67, in column 3, lines 30, 40, 47 and 55 and in column 4, lines 8 and 41 delete "volatized" and insert therefor - - volatilized - -.

In column 3, line 37, delete "volatization" and insert therefor - - volatilization - -.

In column 3, line 39, delete "volatize" and insert therefor - - volatilize - -.

Column 5, line 14, column 5, line 20, and column 6, lines 14-15, delete "volatizing" and insert therefor --volatilizing--.

Column 5, line 22, column 6, line 18, column 6, line 27, and column 6, line 30, delete "volatized" and insert therefor --volatilized--.

Signed and Sealed this

Twenty-ninth Day of March, 1994

*Attest:*

BRUCE LEHMAN

*Attesting Officer*    Commissioner of Patents and Trademarks